(12) United States Patent
Wu et al.

(10) Patent No.: US 7,310,512 B2
(45) Date of Patent: Dec. 18, 2007

(54) RADIO COMMUNICATION METHOD, RADIO COMMUNICATION SYSTEM, WIDE AREA RADIO COMMUNICATION BASE STATION, AND RADIO COMMUNICATION TERMINAL

(75) Inventors: Gang Wu, Koganei (JP); Khaled Mahmud, Koganei (JP); Masugi Inoue, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 10/500,189

(22) PCT Filed: Dec. 17, 2002

(86) PCT No.: PCT/JP02/13187

§ 371 (c)(1),
(2), (4) Date: Oct. 25, 2004

(87) PCT Pub. No.: WO03/058999

PCT Pub. Date: Jul. 17, 2003

(65) Prior Publication Data

US 2005/0118997 A1 Jun. 2, 2005

(30) Foreign Application Priority Data

Dec. 28, 2001 (JP) ............................. 2001-401373

(51) Int. Cl.
*H04M 1/66* (2006.01)
*H04M 1/68* (2006.01)
*H04M 3/16* (2006.01)
*H04Q 7/20* (2006.01)
*G08B 5/22* (2006.01)

(52) U.S. Cl. ...................... 455/410; 370/7.1; 370/7.25; 370/7.28; 370/313; 455/426.1; 455/458; 455/459

(58) Field of Classification Search ............. 455/432.1, 455/432.2, 435.2, 458, 459, 461, 462, 550.1, 455/552.1, 426, 553.1, 554.2, 556.1, 410, 455/426.1; 370/351, 352, 353, 401, 466, 370/493; 340/7.21, 7.29, 7.25, 7.28, 313
See application file for complete search history.

(56) References Cited

U.S. PATENT DOCUMENTS 5,175,758 A * 12/1992 Levanto et al. ............. 455/458

(Continued)

FOREIGN PATENT DOCUMENTS

| AU | 9710092 | 10/1996 |
|---|---|---|
| CA | 2192513 | 7/1997 |
| EP | 0784412 A2 | 7/1997 |

(Continued)

*Primary Examiner*—William D. Cumming
(74) *Attorney, Agent, or Firm*—Birch, Stewart, Kolasch & Birch, LLP (57) ABSTRACT

The present invention is intended to provide, for a wireless communication system originally having a calling function, a wireless communication system enabling an audio communication service or the like which requires a calling function, and to provide a wireless communication system which reduces power consumption of a wireless terminal when it is in a standby mode. A communication party, which is a calling side, a network to which the communication party is connected, and a wireless LAN base station, a pager base station, and a pager controller which are connected to the network, and a PC, which is a wireless communication terminal, constitute the present invention. The PC includes a wireless LAN card and a pager card 2. This forms the present invention.

13 Claims, 9 Drawing Sheets

U.S. PATENT DOCUMENTS

| | | | | |
|---|---|---|---|---|
| 5,463,623 A | * | 10/1995 | Grimes et al. | 370/466 |
| 5,541,976 A | * | 7/1996 | Ghisler | 455/426.1 |
| 5,581,594 A | * | 12/1996 | McAfee | 340/7.1 |
| 5,701,337 A | * | 12/1997 | Silver et al. | 455/426.1 |
| 5,742,906 A | * | 4/1998 | Foladare et al. | 455/461 |
| 5,802,470 A | * | 9/1998 | Gaulke et al. | 455/426.1 |
| 5,867,779 A | * | 2/1999 | Miyazaki et al. | 340/7.28 |
| 6,188,907 B1 | * | 2/2001 | Reding et al. | 455/459 |
| 6,243,581 B1 | * | 6/2001 | Jawanda | 455/432.2 |
| 6,275,477 B1 | * | 8/2001 | Trompower et al. | 370/313 |
| 6,327,475 B1 | * | 12/2001 | Fujimori et al. | 455/458 |
| 6,463,277 B1 | * | 10/2002 | Miska et al. | 455/410 |
| 6,496,693 B1 | * | 12/2002 | Tran | 455/426.1 |
| 6,542,751 B1 | * | 4/2003 | Blink et al. | 455/458 |
| 6,965,297 B1 | * | 11/2005 | Sandahl | 340/7.25 |

FOREIGN PATENT DOCUMENTS

| | | |
|---|---|---|
| ES | 2091148 | 10/1996 |
| FR | 2668278 | 4/1992 |
| GB | 2254526 A | 10/1992 |
| JP | 63-224422 A | 9/1988 |
| JP | 2-288537 A | 11/1990 |
| JP | 3-32236 A | 2/1991 |
| JP | 4-196833 A | 7/1992 |
| JP | 5-502150 A | 4/1993 |
| JP | 8-265248 A | 10/1996 |
| JP | 9-224288 A | 8/1997 |
| JP | 2001-352341 A | 12/2001 |
| WO | WO92/04797 | 3/1992 |

* cited by examiner

RADIO COMMUNICATION METHOD, RADIO COMMUNICATION SYSTEM, WIDE AREA RADIO COMMUNICATION BASE STATION, AND RADIO COMMUNICATION TERMINAL

TECHNICAL FIELD

The present invention relates to a wide-area wireless communication system having a calling function, an apparatus used jointly with another wireless communication system, and a method for jointly using the apparatus.

In particular, the present invention relates to a technology which, by using a calling function of a wide-area wireless communication system having the calling function, uses a wireless communication system having no calling function by regarding this wireless communication system as a wireless communication system having a virtual calling function, or to a technology which, by using a calling function of a wide-area wireless communication system having the calling function, enables power saving in a wireless communication system regardless of whether the wireless communication system has a calling function.

BACKGROUND ART

Although cellular phone systems have been widespread in recent years, it has two major issues. One is a matter of data communication charges. This is a problem in that, since the cellular phone system is designed assuming speech service, efficient transmission of data is difficult by contrast, resulting in difficulty of reducing data communication charges.

Accordingly, it is difficult to cope with exploding demands of data communication caused by widespread use of the Internet.

The second issue is a problem of establishing an infrastructure. The more the cellular phone system is requested to provide advanced service at higher speed, the more the system becomes complex, so that it requires a lot of costs for the infrastructure. This results in problems in that communication charges increase, expansion of a service area takes a long time, and an area which is not provided with service appears.

In addition to the widespread use of the cellular phone system, a so-called wireless LAN attracts attention in accordance with increased demands of wireless data communication in the recent years. Although a wireless LAN has begun to come into widespread use as an indoor, independent wireless communication system, it has recently begun to become used as an outdoor public communication system.

Since a wireless LAN is designed for dedicated use for data communication, it is an optimal system for use in data communication. A strong demand is expected that the wireless LAN, which has such advantages, be used not only in data communication but also in audio communication which has been provided in conventional cellular telephone.

Nevertheless, a wireless data communication as typified by a wireless LAN has two problems in that it does not have a calling function and that it does not have a power saving function.

The first problem is caused by an inability of a network side to grasp the geographical position of a terminal (what wireless communication base station has an area in which the terminal is positioned) since the system is simplified. Accordingly, in the case of calling the terminal, a call signal must be transmitted from each of all wireless communication base stations.

However, this method has not been implemented to date because it wastes frequency resources and also releases, to the network, a large amount of control information associated with calling. In other words, prior art has a problem in that it is impossible that, by using a wireless communication system originally having no calling function, an audio communication service or the like that needs a calling function be provided.

The second problem is one caused by a wireless communication method for a wireless data communication system. In a wireless data communication system, in general, data is divided into units called packets, and a terminal and a wireless communication base station transmit information to each other in units of packets.

In this case, to enhance a packet multiplexing effect as much as possible, in general, for example, a method called CSMA (Carrier Sense Multiple Access) classified into a random access method is used.

In this method, one terminal sends its packets after confirming that another terminal or a base station sends no packets. In other words, the terminal cannot transmit packets unless it is always in a state capable of receiving packets. Accordingly, regardless of whether the terminal transmits packets, it must always operate only a receiving function, so that the power consumption of its circuit is very large. For example, a portable Internet wireless telephone terminal that is a combination of an existing wireless LAN unit and a small battery has a standby time of 24 hours or less. Accordingly, it may not be actually said that the portable Internet wireless telephone terminal does not serve for practical use.

This problem of power saving is not limited to a wireless communication system as typified by a wireless LAN, but applies to also wireless telephone systems such as cellular phones and PHSs. In these systems, a mechanism for a terminal to periodically and intermittently receive a broadcasting signal from a base station is utilized in order that, in a standby mode, the terminal may determine anytime whether it is called by a network side. Although this method achieves an extended standby time by reducing the amount of power consumption in the standby mode, more power saving and extension in standby time are expected.

DISCLOSURE OF INVENTION

The present invention has been created in view of the problems in the above-described prior art. In other words, the present invention provides, for a wireless communication system originally having no calling function (where the term "calling" refers to the function of making an electronic connection with another party whether speaking is performed or not, and may also be referred to as "paging"), a wireless communication system enabling an audio communication service requiring a calling function, and a wireless communication system which reduces power consumption when a wireless terminal is in a standby mode.

To solve the above problems, the present invention provides the following means. In other words, by using a wide-area wireless communication system capable of wireless calling, and a wireless communication system capable data communication, a wireless communication method for performing wireless communication between a calling side and a called side is created.

The method starts with a call-sending step of sending a call to the called side by the calling side, and goes through a calling step of using a wide-area wireless communication system to call a receiving means in a wireless communication terminal of the called side, and a calling detecting step of detecting, by the wireless communication terminal, calling from the wide-area wireless communication system.

One feature of the present invention is that the wireless communication terminal includes, in addition to the receiving means for receiving calling from the wide-area wireless communication system, a wireless communication means for performing wireless communication by the wireless communication system.

In the next calling detecting step, the receiving means notifies the wireless communication means that it has been called.

Based on the notification, a consecutive wireless communication process is executed which comprises a connecting step of connecting to the wireless communication system by the wireless communication means, a communication step of performing wireless communication between the calling side and the called side, and a disconnecting step of disconnecting connection to the wide-area wireless communication system by at least one of the calling side and the called side.

In the above wireless communication method, data communication is considered. Here, this method may be a method in which what is communicated is audio data and audio communication is realized.

In the above, the wide-area wireless communication system may be either unidirectional or bidirectional. In particular, a wide-area wireless communication system designed so as to be specialized for calling service is a very efficient system concerning a calling function, and can accommodate a large number of users. In addition, a reduction in power consumption is sufficiently achieved, thus enabling a long standby time of approximately one to two months despite a small battery. In addition, since a production technology is matured, an apparatus carried by a user is characterized in that its size is reduced to a card size. Accordingly, this is particular preferable in practicing the present invention.

In addition, the present invention can provide the following wireless communication system. The present invention can further provide each of a wide-area wireless communication system base station and a wireless communication terminal which are used in the above wireless communication system.

The following describes the configuration of a wireless communication system (hereinafter referred to as this system) of the present invention which is capable of data communication.

This system comprises a calling terminal for a calling side to perform communication, a network to which the calling terminal is connected, a wireless communication base station and a wide-area wireless communication base station which are connected to the network, and a wireless communication terminal for a called side to perform communication.

The wireless communication terminal simultaneously comprises a receiving means for receiving a call from the wide-area wireless communication base station, and a communication means for performing data communication with the wireless communication base station. This enables reception of a call by the receiving means and wireless communication by the communication means. All wireless communications performed by the communication means are linked to the network through corresponding wireless communication base stations. Similarly, also in the wide-area wireless communication system, all communications by the receiving means are performed through the wide-area wireless communication base station.

Here, in a configuration in which the network is capable of communicating audio information, the wireless communication terminal may perform audio communication. For that purpose, the wireless communication terminal comprises an audio input/output means for inputting and outputting audio, and an audio conversion means for performing mutual conversion between audio information and data information.

By forming the wide-area wireless communication base station to be a base station for so-called pagers such as pocket bells, an already established pager infrastructure can be used. In this configuration, the wireless terminal includes a receiving means corresponding to the pager base station, and, in addition, the wireless communication system may be a wireless LAN (Local Area Network), WAN (Wide Area Network), PAN (Personal Area Network), or ITS (Intelligent Transport System) system. This makes it possible for a public line or the like to initiate wireless communication by using a call from a pager even in a LAN, WAN, PAN, or ITS wireless communication having no calling function.

In addition, similarly, in a configuration in which the wide-area wireless communication base station is a pager base station, the wireless communication system may be a wireless telephone system using a cellular phone or a PHS (Personal Handyphone System). In this configuration, even in a wireless telephone system in which it is difficult to achieve power saving if a calling function is provided, such as the cellular phone and PHS, power saving can be achieved by jointly using a pager. Moreover, also in the wireless telephone system, in the case of using a line dedicated for communication, the present invention enables calling and audio communication, although audio communication is conventionally impossible.

Regarding a technique for achieving power saving, in the wireless communication terminal, only the receiving unit for the wide-area wireless communication system is activated and is on standby, while the communication means for the wireless communication system is inactivated (switching off the power, or the like), whereby remarkable power saving can be achieved compared with a conventional communication means.

Portions denoted by reference numerals are as follows: 1: wireless LAN card, 2: pager card, 3: PC, 4: control unit, 40: PCI bus, 41: power control unit, 42: sending/receiving control unit, 43: packet-information extracting/generating unit, 44: CPU, 45: audio/data conversion unit, 46: information input/output device, 48: memory, 49: external storage device, 5: wireless LAN base station, 6: pager base station, 7: network, 8: pager control station, 50: network adapter, 51: sending/receiving control unit, 52: packet extracting/generating unit, 53: network-ID/pager-ID converting unit, 54: CPU, 55: memory, 56: network-ID/pager-ID correspondence table, 560: user network ID, 561: user pager ID, 57: external storage device, 9: communication party, 10: communication request packet, 100: user network ID, 101: communication party network ID, 102: communication request, 11: pager calling packet, 110: user pager ID, 111: communication network ID, 112: communication request, 12: reception notification packet, 120: communication party network ID, 121: user pager ID, 122: reception permission, 13: communication packet, 130: destination network ID, 131: transmission source network ID, and 132: audio data.

BEST MODE FOR CARRYING OUT THE INVENTION

A method for practicing the present invention is described below based on an embodiment shown in the drawings. The embodiment of the present invention is not limited to the following, but may be modified if needed.

This embodiment assumes a pager system as a wide-area wireless communication system. In addition, a wireless LAN system is treated as an example of a wireless communication system having no calling function or a wireless communication system in which power saving needs to be achieved. A case in which audio communication is performed between a user having a PC including a pager card and a wireless LAN card and a user on a network is described.

Figure 1:
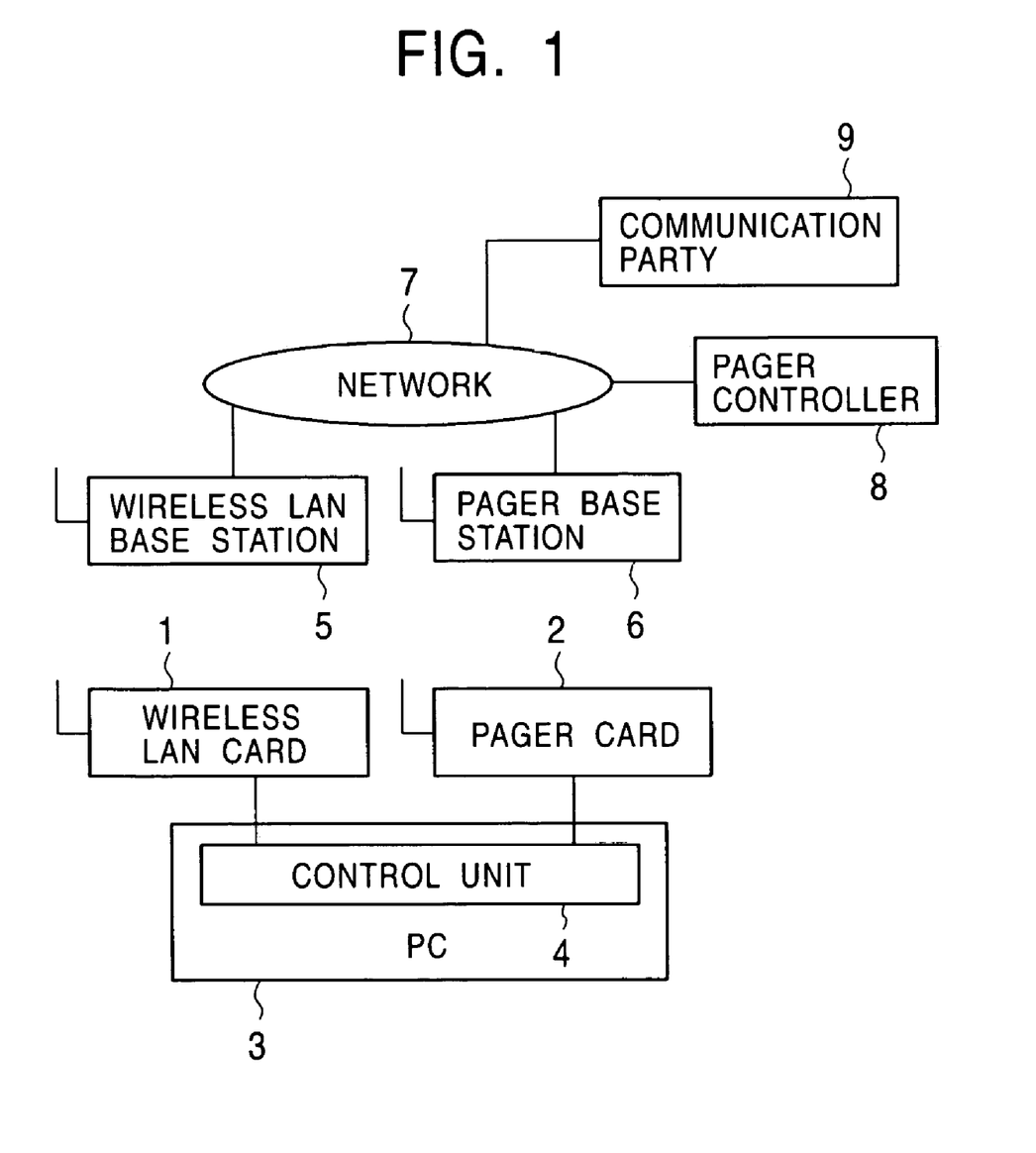
FIG. 1 is a block diagram illustrating a network environment including a wireless communication section in this embodiment.

At first, the wireless communication terminal, that is, the user-side apparatus, is described. The user has a PC (3) capable of connecting a wireless LAN card (1) which is a wireless communication means in a wireless communication terminal, and a pager card (2) which is a receiving means in a wide-area wireless communication system.

In the PC (3), a control unit (4) which connects the wireless LAN card (1) and the pager card (2) is mounted.

On the network side, a wireless LAN base station (5) which is a wireless communication base station, a pager base station (6) which is a wide-area wireless communication base station, and a pager controller (8) are connected to a network (7). The network (7) further connects to a PC (9) which is a communication party.

Figure 2:
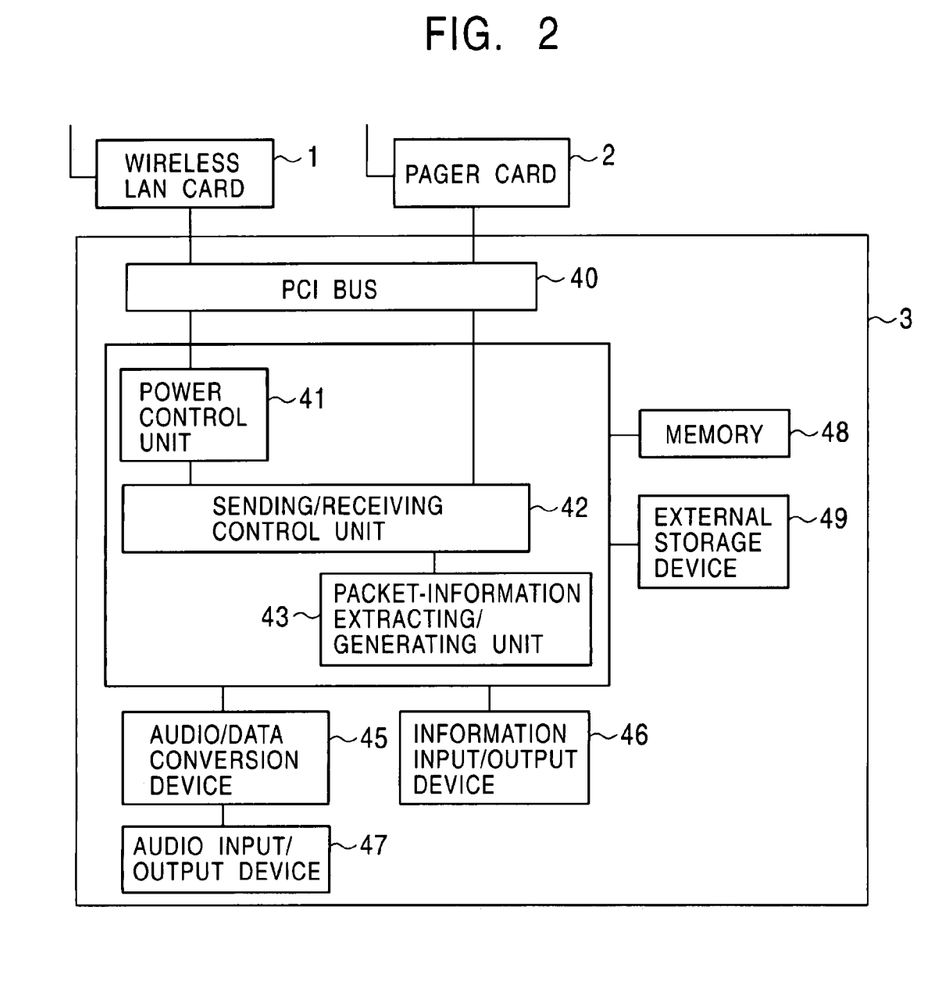
FIG. 2 is a block diagram of a wireless terminal in this embodiment.

Next, the internal structure of the control unit (4) is fully described. FIG. 2 shows a block diagram of the wireless communication terminal in this embodiment. Both the wireless LAN card (1) and the pager card (2) are in a state capable of mutually exchanging information with a CPU (44) through a PCI bus (40).

The CPU (44) can execute the functions of a power control unit (41), a sending/receiving control unit (42), and a packet-information extracting/generating unit (43) by reading programs stored beforehand in an external storage device (49). In the execution, a memory (48) is also used.

The control unit (4) has an audio/data converting device (45), an audio input/output device (47), and an information input/output device (46) other than the above units.

Figure 3:
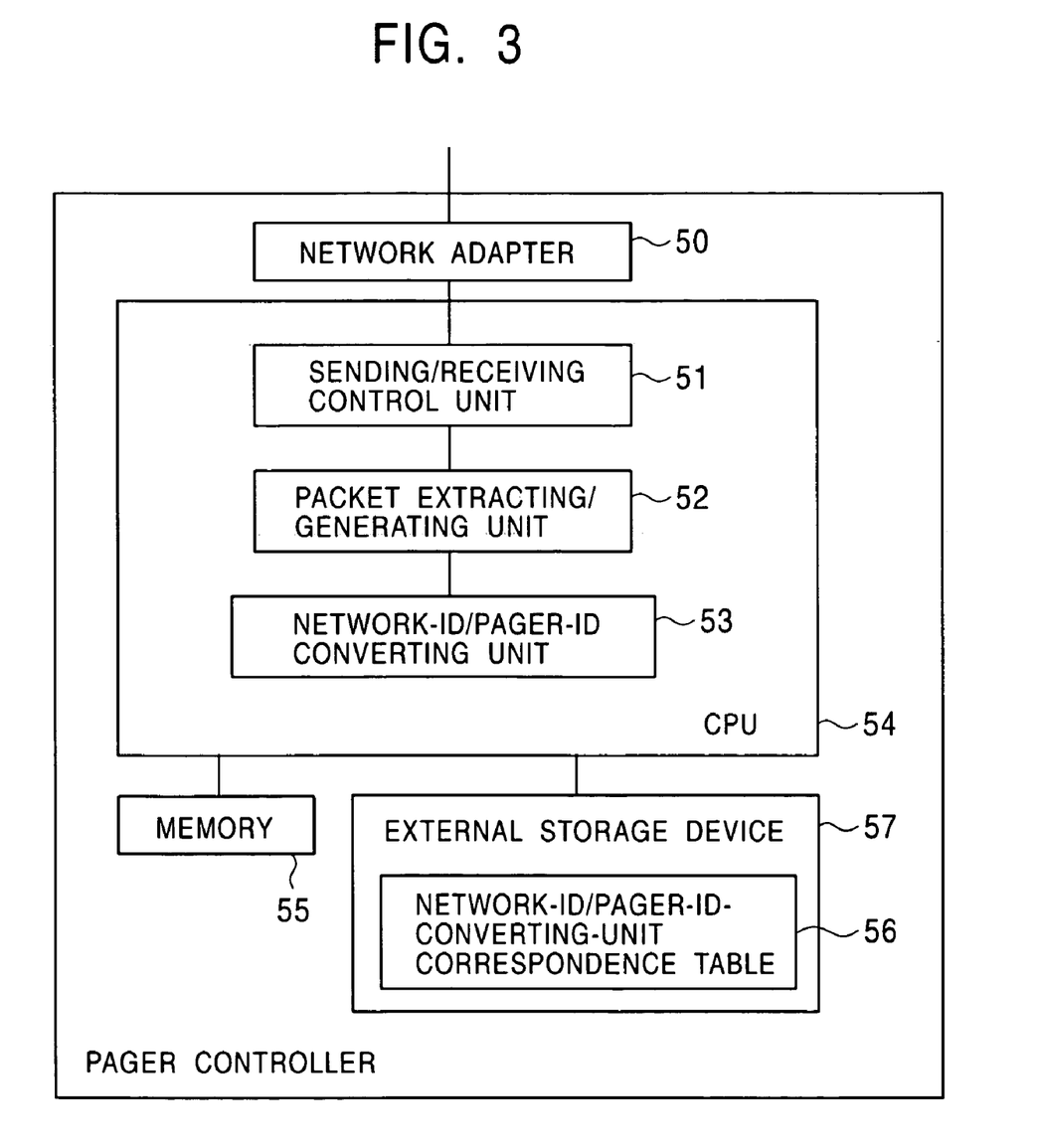
FIG. 3 is a block diagram of a pager controller in this embodiment.

Next, the internal structure o the pager controller (8) is fully described. FIG. 3 shows a block diagram of the pager controller. Although this embodiment shows a configuration in which the pager controller (8) is provided separately from the pager base station (6), in the configuration of the wide-area wireless communication base station in the present invention, the pager controller (8) may be independently provided via the network in the above manner, and may be integrally provided in a form connected to the network.

A CPU (54) can exchange information with the network through a network adapter (50), and can also exchange information with a memory (55) and an external storage device (57).

The CPU (54) executes the functions of a sending/receiving control unit (51), a packet extracting/generating unit (52), and a network-ID/pager-ID converting unit (53) by reading programs stored beforehand in the external storage device (57). The external storage device (57) stores a network-ID/pager-ID correspondence table other than programs for the above functions (51), (52), and (53).

Figure 4:
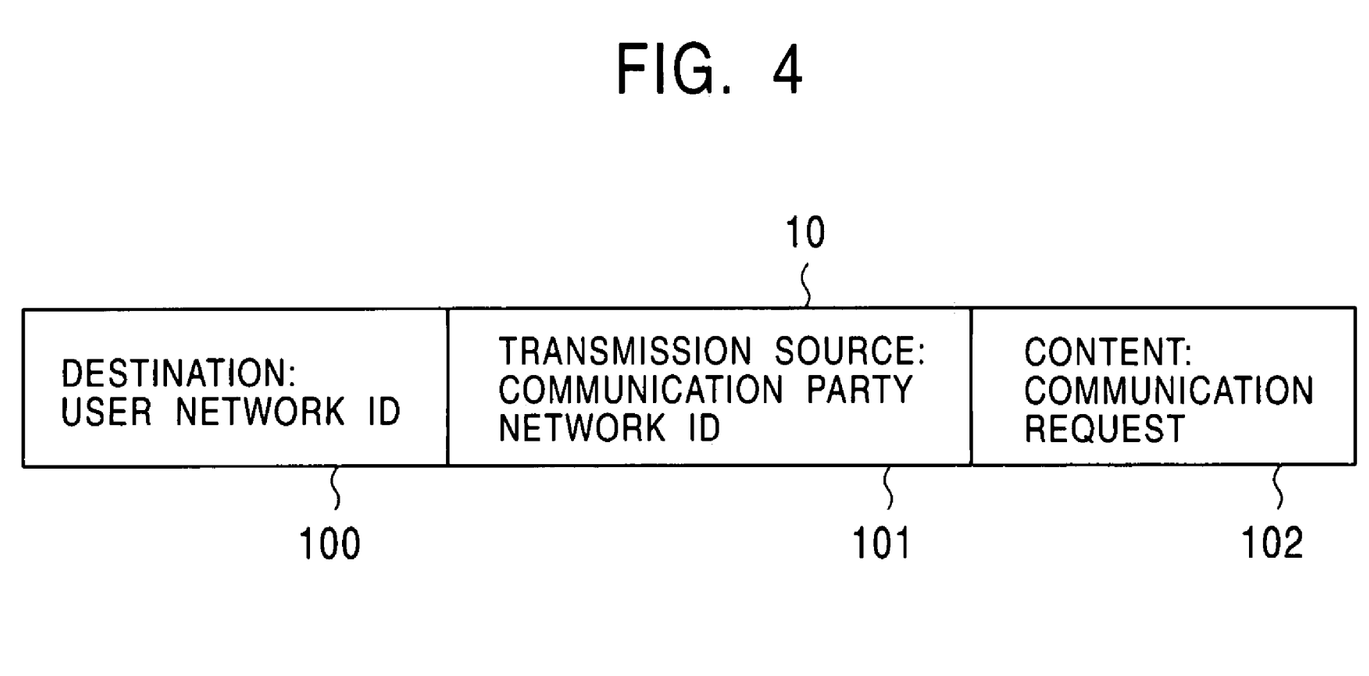
FIG. 4 is a configuration diagram of a communication request packet in this embodiment.

The following describes an operation in a case in which a communication party (the user of the PC (9)) on the network (7) calls a user having the wireless LAN card (1) and the pager card (2). This operation is shown by the flow chart of FIG. 9, with the steps of the method indicated below. FIG. 4 shows a configuration diagram of a communication request packet.

Figure 9:
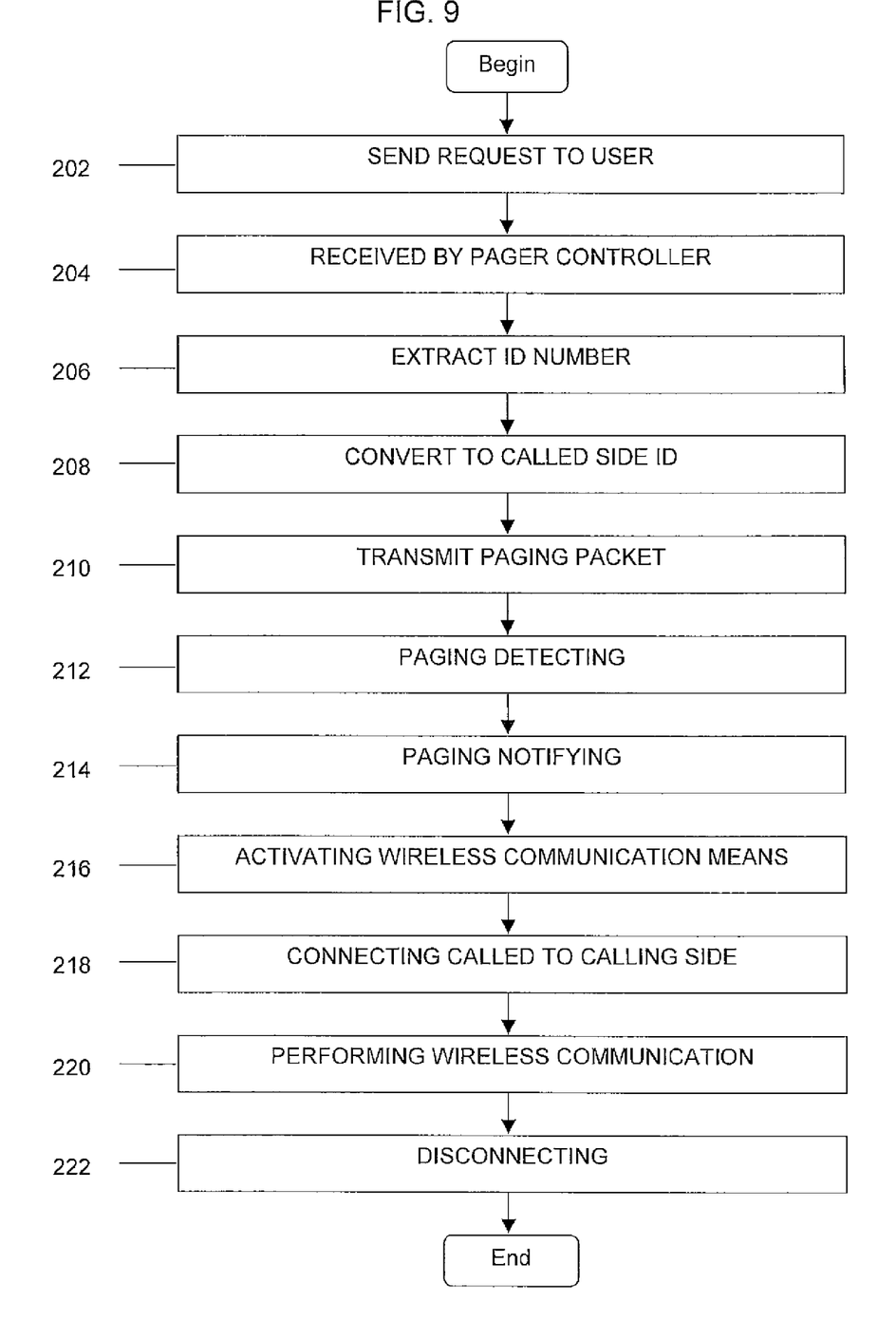
FIG. 9 is a flow chart of the method of the resent invention.

At first, the communication party sends a sending request directed to the user (step 202) by inputting, to the PC (9), a network ID representing a user with which the communication party will communicate. When receiving the sending request, the PC (9) generates a communication request packet (10) which indicates a network ID (100) of the user, which is a destination, a network ID (101) of the communication party, which is a transmission source, and a communication request (102), which is content and transmits the communication request packet (10) to the network (7).

The communication request packet (10) is transmitted to the pager controller (8) (step 204), to which the user belongs, by an exchanging function of the network (7). In the pager controller (8), the communication request packet (10) reaches the packet extracting/generating unit (52) through the network adapter (50) and the sending/receiving control unit (51).

The packet extracting/generating unit (52) decomposes the communication request packet (10) and confirms destination information, transmission source information, and content (step 206). The network ID (100) of the user which is the destination information is transmitted to the network-ID/pager-ID converting unit (53).

Figure 5:
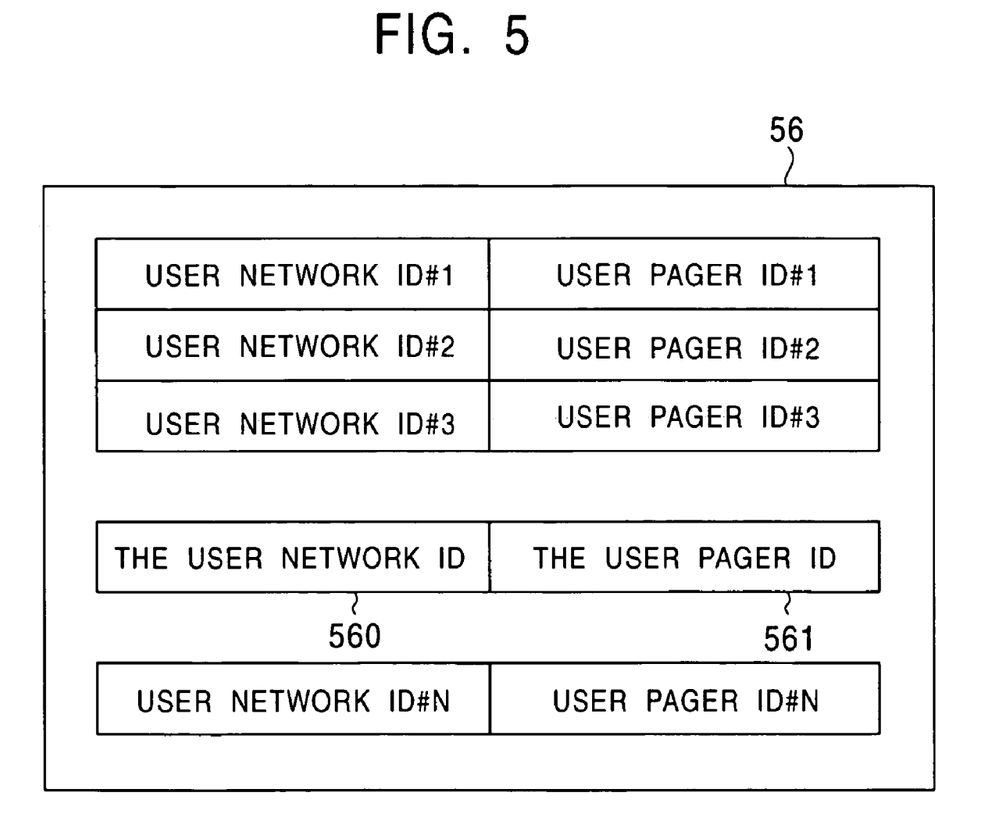
FIG. 5 is a configuration diagram of a network-ID/pager-ID correspondence table in this embodiment.

The network-ID/pager-ID converting unit (53) (step 208) refers to a correspondence table (56) of user network IDs and pager IDs of all users which is stored in the external storage device (57). The configuration of the correspondence table (56) is shown in FIG. 5.

By using the correspondence table (56), a network ID (560) which matches the network ID (100) of the user is found, a pager ID (561) corresponding to the network ID (560) is acquired as a pager ID of the user.

Based on the pager ID (561) and the network ID (101), the packet extracting/generating unit (52) generates a pager calling packet (11) (step 210). The generated pager calling packet (11) (step 212) is transmitted to the network (7) through the sending/receiving control unit (51) and the network adapter (50). An exchanging function of the network (7) based on a pager ID (110) allows the pager calling packet (11) to reach at least one or plural pager base stations (6).

The pager base station (6) wirelessly transmits the pager calling packet (11) received from the network (7) to space. The pager card (2) retained by the user receives a wireless signal including the pager calling packet (11). The received wireless signal is restored as the pager calling packet (11) by the pager card (2), and is transmitted to the CPU (44) through the PCI bus (40).

In the CPU (44), after the sending/receiving control unit (42) initially confirms reception, the pager calling packet (11) is transmitted to the packet-information extracting/generating unit (43). Based on a communication request (112) stored as content in the pager calling packet (11), the packet-information extracting/generating unit (43) recognizes that the pager calling packet (11) requests communication (step 214).

Figure 6:
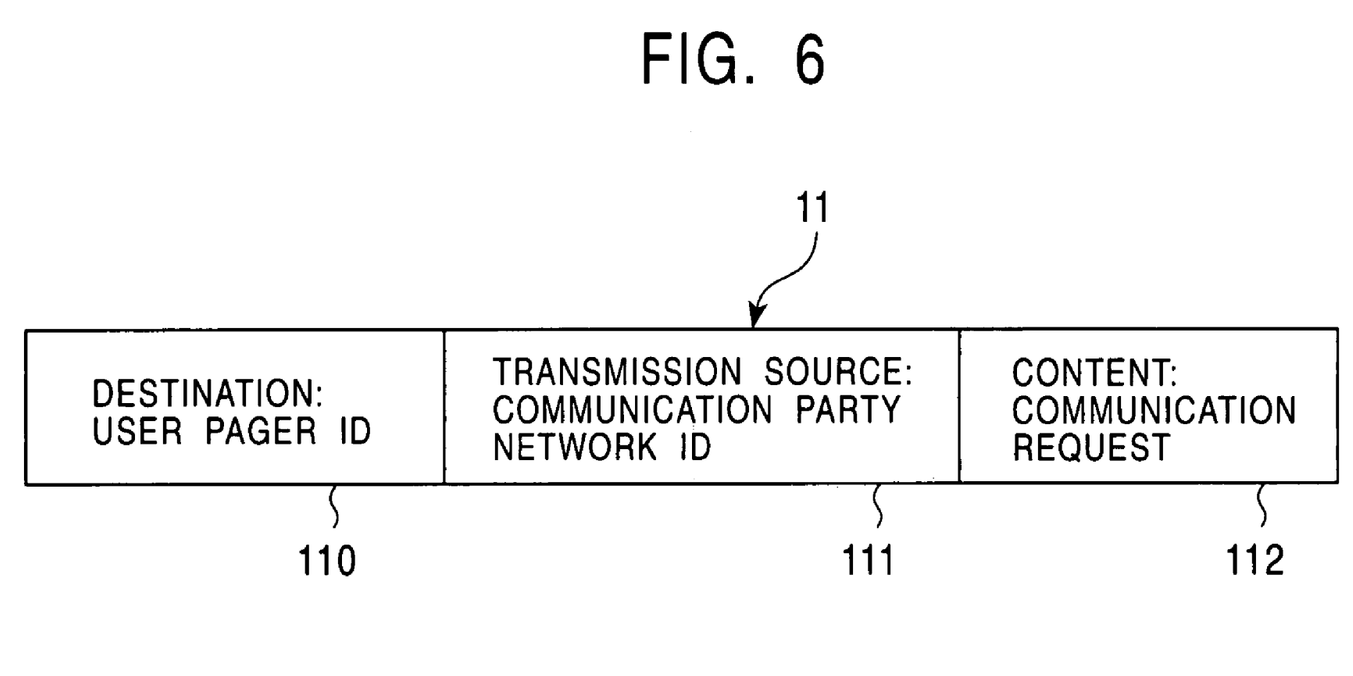
FIG. 6 is a configuration diagram of a pager calling packet in this embodiment.
Figure 7:
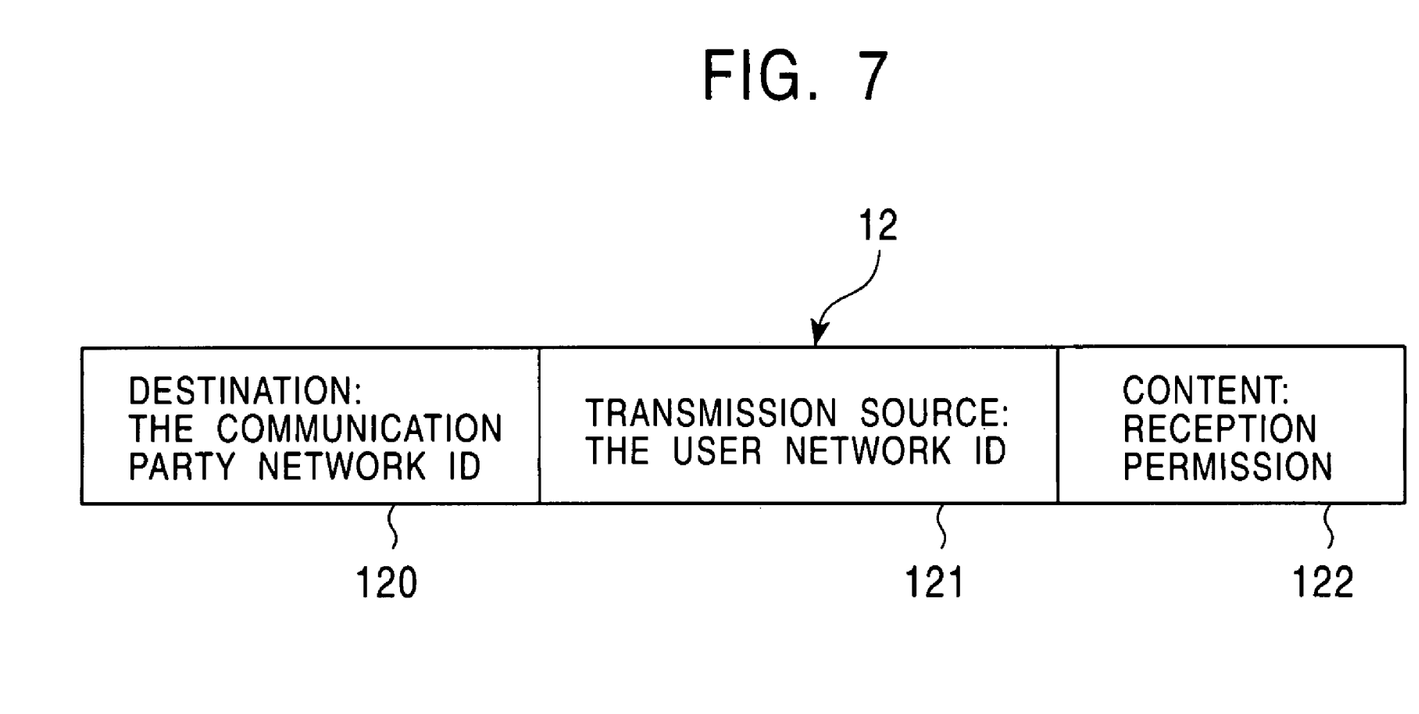
FIG. 7 is a configuration diagram of a reception notification packet in this embodiment.

Next, a communication party network ID (111) stored as a transmission destination is extracted and is displayed for the user by the information input/output device (46). When the user, who has confirmed reception, uses the information input/output device (46) to permit communication, the packet-information extracting/generating unit (43) generates a reception notification packet. FIG. 6 shows the configuration of a reception notification packet (12).

The reception notification packet (12) includes the communication party network ID (120) as a destination, the user network ID (121) as a transmission source, and a reception permission (122) as content.

The reception notification packet (12) is transferred to the sending/receiving control unit (42). In order to set the wireless LAN card (1), which has operated in a power-off or power saving state, to be in a state capable of performing transmission, the sending/receiving control unit (42) commands the power control unit (41) to switch on the wireless LAN card (1) or to change the power-saving state into the state capable of performing transmission. Based on the command, by switching on the power of the wireless LAN card (1) or changing the power saving state to the state capable of performing transmission through the PCI bus (40) step 216, the power control unit (41) sets the wireless LAN card (1) to be in the capable of performing transmission.

After that, the sending/receiving control unit (42) transfers the reception notification packet (12) to the wireless LAN card (1) through the PCI bus (40), and the wireless LAN card (1) converts the transferred wireless LAN card (1) into a wireless signal and transmits the signal from an antenna.

The transmitted wireless signal is received by the wireless LAN base station (5). The reception notification packet (12) is restored, and the restored packet is transmitted to initiate a call (step 218) with the PC (9) of the communication party by the exchanging function of the network (7) based on the communication party network ID (120).

Figure 8:
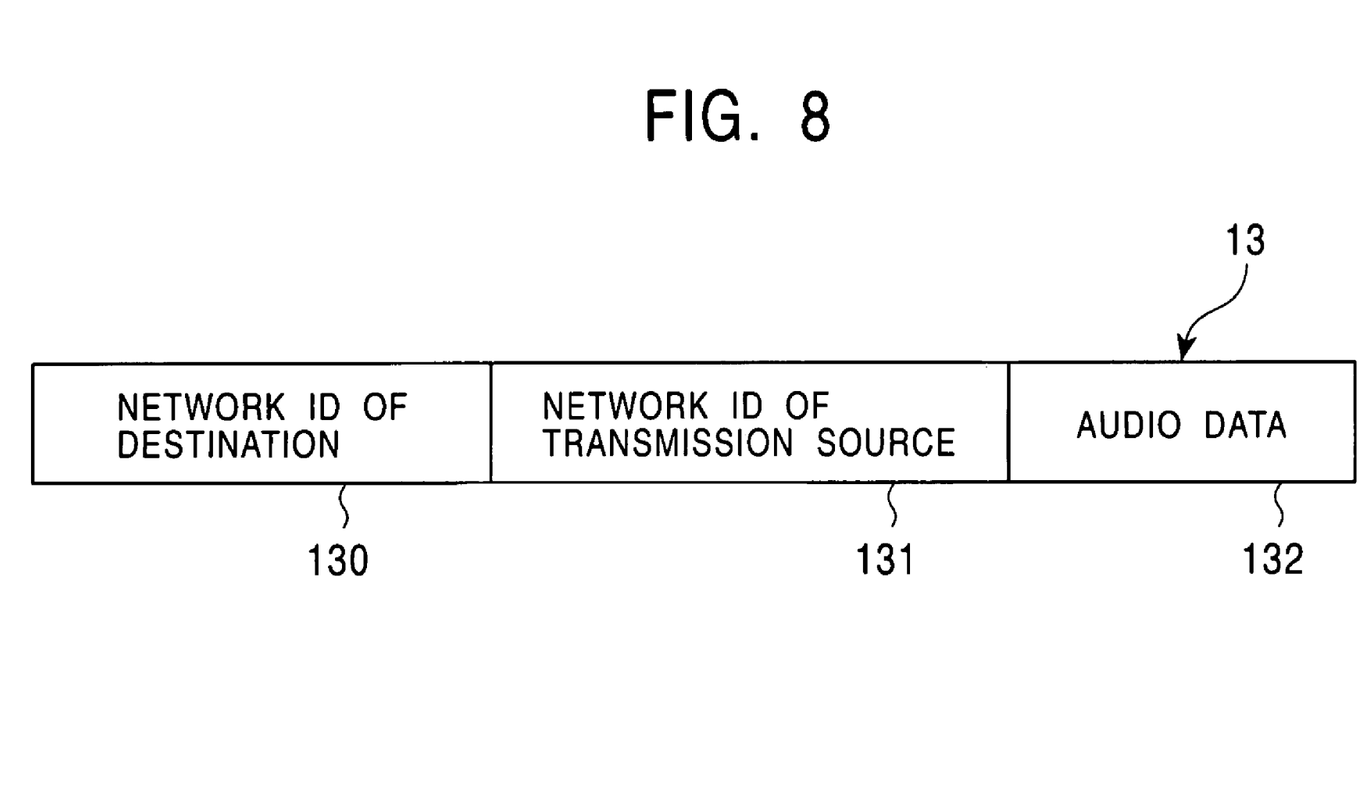
FIG. 8 is a configuration diagram of a communication packet in this embodiment.

FIG. 8 shows the configuration of a communication packet (13) for use in a call. The communication packet (13) is constituted by a network ID (130) of a destination, a network ID (131) of a transmission source, and audio data (132).

For example, the communication packet (13) sent from the PC (9) reaches the PC (4) through the network (7), the wireless LAN base station (5), and the wireless LAN card (1). The packet-information extracting/generating unit (43) extracts the audio data (132) from the communication packet (13) and transfers the extracted data to the audio/data converting device (45). Here, the audio data (132), which is a digital data series, is converted into an analog audio signal, and the audio signal is output from the audio input/output device (47) (step 220).

Conversely, a speech audio signal acquired from the audio input/output device (47) is transferred to the audio/data converting device (45), and is converted into audio data. The packet-information extracting/generating unit (43) generates the communication packet (13), whose content is the audio data, and which includes a network ID of a destination and a network iD of a transmission source, and transmits the generated packet to the PC (9) of the communication party through the wireless LAN card (1), the wireless LAN base station (5), and the network (7). The wireless LAN card (1) is in an on-state when being in such a communication mode. When the sending/receiving control unit (42) detects termination of communication (step 222), the wireless LAN card (1) is switched to a power-off state or power saving state by using the power control unit (41) and the PCI bus (40).

As described above, in this embodiment, by providing the PC (9) with the wireless LAN card (1) and the pager card (2), the wireless communication terminal is formed. This succeeds in implementing data communication and speech conversation in a wireless LAN system in which calling is impossible, by using an existing pager system infrastructure.

However, the present invention is not limited to the above embodiment. As the configuration of a wireless communication system, wireless telephone systems for WAN, cellular phones, and PHSs may also be used.

For example, cellular phones need to perform periodic communication, even if they are not in a call mode, so that not only power is consumed, but also influence of electromagnetic waves on health is pointed out. However, according to the above system, even in a communication method using cellular phone lines, the power supply can be kept in an off state until calling from a pager or the like is received. Accordingly, these problems are solved.

In addition, the above uses a pager system. However, in practicing the present invention, a wide-area wireless communication system capable of calling may be used. Thus, for example, by using a sub-address adding function in a digital cellular phone or PHS, a communication request can be sent simultaneously with call sending.

Regarding a network on which calling side terminals, such as PCs, wireless communication base stations, such as wireless LAN base stations, and, in addition, wide-area wireless communication base stations, such as pager stations, are connected to one another, various networks, such as the Internet and a telephone network, may be used.

In particular, by providing each of a calling side terminal and base stations with an exchanging function in which communications are exchanged between different types of networks, for example, a configuration may be used in which a wireless LAN base station connects to a calling side terminal through a telephone network.

According to the present invention, a wide-area wireless communication system capable of wireless calling and a wireless communication system capable of data communication can be used in combination. Thus, for example, for a wireless communication system having no calling function, the present invention enables provision of data communication, audio communication service, etc., which require calling functions.

In addition, by using a pager system for a wide-area wireless communication system, excess capacity of the pager system can be effectively used, and, at the same time, this contributes to provision of a low cost communication system.

Moreover, in a configuration in which a wireless LAN system, which has come into widespread use in recent years, is used as the above wireless communication system, a wireless communication terminal incapable of calling, connected through a wireless LAN, can be called. Therefore, a wireless LAN system which has a low communication cost and which realizes comfortable communication environments is further utilized.

Accordingly, also in a case in which a wireless LAN is not limited to in-house and in-enterprise use, but is built as a public infrastructure in future, it can be utilized as a diversified communication method including an audio communication service.

Moreover, by applying the present invention to a wireless communication terminal which consumes a lot of power even in a standby mode, such as a cellular phone or PHS, the power consumption of the terminal can be dramatically reduced. This can extend the standby time of a wireless communication system in combination with a wide-area wireless communication system capable of being continuously used for a long time. Therefore, a wireless communication terminal capable of coping for a long time with an environment in which charging is difficult can be provided.

The invention claimed is:

1. A wireless communication method for performing wireless communication by using a network connecting a wide-area wireless communication system capable of wireless paging and one or more wireless communications systems, between a calling side connecting through the network to any wireless communication system or the wide-area wireless communication system and a called side connecting to another wireless communication system in the network, the method comprising:

a paging-sending step of sending a communication request packet including a calling side ID number on the network and a called side ID number on the network to the called side by the calling side;

a converting step of converting the called side ID number on the network into a called side ID number on the wide-area wireless communication system;

a paging step of paging a receiving means in a wireless communication terminal of the called side by sending a paging packet including the called side ID number on the wide-area wireless communication system and the calling side ID number on the network;

a paging detecting step of detecting, by the wireless communication terminal, paging from the wide-area wireless communication system;

a paging notifying step of notifying, by the receiving means in the wireless communication terminal, wireless-communication-controlling wireless communication means that the receiving means has been paged along with the calling side ID number on the network;

a connecting step of connecting the called side to the calling side by sending a reception notification packet from the wireless communication means to the calling side ID number on the network through any wireless communication system in the network;

a communication step of performing wireless communication between the calling side and the called side; and a disconnecting step of disconnecting connection to the wide-area wireless communication system by at least one of the calling side and the called side.

2. A wireless communication method according to claim 1, wherein, in the communication step, a speech conversation is performed.

3. A wireless communication system capable of data communication, comprising:

a paging terminal for a calling side to perform communication;

a network connecting one or more wireless communication systems to which said paging terminal is connected;

a wireless communication base station and a wide-area wireless communication base station which are connected to said network; and a wireless communication terminal for a called side connecting to another wireless communication system in the network to perform communication, wherein the wireless communication terminal has a receiving means to extract a calling side ID number on the network in a paging packet including the calling side ID number and being sent from said wide-area wireless communication base station; and communication means for performing data communication with a calling side having the calling side ID number by using any wireless communication systems capable of data communication with said wireless communication base station.

4. The wireless communication system according to claim 3, wherein, in a configuration in which said calling terminal is capable of communicating audio information on said network, said wireless communication terminal comprises:

audio input/output means for inputting and outputting audio; and audio conversion means for performing mutual conversion between audio information and data information.

5. The wireless communication system according to claim 3 or 4 wherein:

said wide-area wireless communication base station is a pager base station, a cellular phone base station, or a PHS (Personal Handyphone System) base station, and the wireless terminal includes receiving means corresponding to said pager base station; and said wireless communication system is a wireless LAN (Local Area Network), WAN (Wide Area Network), PAN (Personal Area Network), or ITS (Intelligent Transport System) system.

6. A wireless communication terminal capable of communicating with both a wide-area wireless communication system capable of wireless paging, and a wireless communication system capable of data communication by using a network connecting the wide-area wireless communication system capable of wireless paging and one or more wireless communication systems, the wireless communication terminal comprising:

receiving means for receiving a wireless page in the wide-area wireless communication system;

paging-information recognizing means for recognizing information concerning a calling side ID number on the network and paging details, the information being included in the wireless page; and wireless communication means for performing wireless communication with the calling side having the calling side ID number in the wireless communication system when said paging-information recognizing means requests wireless communication to start.

7. The wireless communication terminal according to claim 6, further comprising wireless-communication-means activating means wherein, in a configuration in which said wireless communication means in the wireless communication terminal is normally in an inactivated state, when the paging-information means requests wireless communication to start, said wireless-communication-means activating means changes said wireless communication means to be activated.

8. The wireless communication terminal according to claim 6 or 7, further comprising:

audio/data conversion means for converting data received by said wireless communication means into audio, and converting audio of the calling side into data; and audio input/output means for outputting the audio obtained by conversion, and inputting audio of a called side to said audio/data conversion means.

9. The wireless communication terminal according to claim 6, wherein:

said receiving means is a pager system terminal, a cellular system terminal or a PHS (Personal Handyphone System) system terminal; and, in addition, said wireless communication means is a network adapter for a wireless LAN (Local Area Network), WAN (Wide Area Network), or PAN (Personal Area Network), or is an ITS (Intelligent Transport System) terminal device.

10. A wireless communication method according to claim 1, which method further comprises after the paging step, activating step of activating wireless communication means in the wireless communication terminal of the called side when the wireless communication means is in an inactivated state.

11. A wireless communication method according to claim 1, wherein the communication step is performed through IP packet.

12. A wireless communication method according to claim 1, wherein:

the sending of the paging packet on the wide-area wireless communication system uses a pager system, a cellular system, or a PHS (Personal Handyphone System) system, and the paging of the receiving means in the wireless communication system uses a wireless LAN (Local Area Network), WAN (Wide Area Network), PAN (Personal Area Network) or ITS (Intelligent Transport System) system.

13. The wireless communication method according to claim 1, wherein in the paging-sending step, the calling side is connected to the network through a cable communication system.

* * * * *